INVENTOR.
Paul E. Knauer,
BY
Lockwood, Woodard, Smith & Weikart
Attorneys.

April 7, 1964 P. E. KNAUER 3,128,335

REMOTE CONTROL SWITCHING NETWORK

Filed Dec. 1, 1961 2 Sheets-Sheet 2

INVENTOR.
Paul E. Knauer,
BY
Lockwood, Woodard, Smith & Weikart
Attorneys.

3,128,335
Patented Apr. 7, 1964

3,128,335

REMOTE CONTROL SWITCHING NETWORK

Paul E. Knauer, Fort Wayne, Ind., assignor to The Magnavox Company, Fort Wayne, Ind., a corporation of Delaware Filed Dec. 1, 1961, Ser. No. 156,379
5 Claims. (Cl. 178—5.8)

This invention relates generally to remote control switch functions and more particularly to means for remote control of television receivers and the like.

In the past, some attention was directed to remote control operation of radio receivers resulting in the development of various types of wired and wireless remote control devices. More recently, much work has been done to provide remote control devices for television receivers. Most of the attention has been directed to the wireless type of device because of the obvious desirability from the customer's standpoint and the resultant desirability from the marketing standpoint. Of course, a major problem in this connection, is the proivsion of a remote control system which will perform the functions desired and yet be of a cost which is compatible with the benefits provided.

Among the functions which can conceivably be performed by remote control systems, mention may be made of turning on the television receiver, channel selection and changing, volume control, tone control, brightness control, horizontal and vertical synchronization control and the turning off of the television receiver. In the interest of economy, the essential functions to be performed must be selected. At least one philosophy has considered the channel selection and volume control functions as the two functions which must be controlled remotely. Accordingly, to perform any of the other mentioned functions, the customer must actually move to the television set and operate the appropriate knobs or buttons. While this philosophy permits the use of only two signal channels in the remote control transmitter and remote control receiver, it does present significant operational disadvantages.

Though a customer may not object to moving to the television set to turn it on, there may be objection to again moving to the television set in order to turn it off. This disadvantage has been obviated by providing a power switch to the set which is operable upon arrival by the channel selector at a position which is not used for station reception in the area of use of the television set. In some instances where this method is used to turn off the set, provision is made for again turning the set on remotely. However, thise necessitates keeping the remote control signal receiver energized during the period that the television set remains off. In order, therefore, to turn the remote control receiver off remotely, an additional function of the remote control system becomes essential. This naturally leadse to a cost increase.

The advantage of being able to turn off the remote control receiver remotely can be particularly appreciated when one considers the use of the television set in a bedroom. Because the customer may wish to turn off the television receiver for a certain length of time and then again turn it on remotely, provision must be made for keeping the remote signal receiver energized. However, the customer should later be able to deenergize the remote receiver without the necessity of getting up and going to the set.

It is, therefore, a general object of this invention to provide an improved remote control switching network for television and the like.

It is a further object of this invention to provide for separate deenergization of a remote control signal receiver by remote control in addition to the remote control functions of station or channel selection and volume control, without specific provision for the three functions in the remote control signal transmitter.

It is a further object of this invention to provide means for achieving the foregoing objectes at an extremely nominal cost and without adding to the number of remote control channels used.

It is a still further object of this invention to provide means for achieving the foregoing objects and providing a standby function whereby the remote receiver remains energized and the television receiver is turned off temporarily, and whereby the television receiver may again be turned on and operated as desired.

It is a still further object of this invention to provide means for achieving the foregoing objects and providing for the turning off of both the television receiver and remote receiver remotely with substantially no increase in complexity of the control system.

Described briefly, a typical embodiment of this invention uses a remote control signal receiver capable of separate responses to super-audible sonic signals to operate the tuner drive motor and volume control switches in the television receiver. The remote receiver functions to change the tuner position upon receipt of a signal of one frequency from a sonic transmitter. It functions to change the volume level in response to a sonic signal of a second frequency from a sonic transmitter. Thus, two channels of a sonic transmitter are used to control the volume and station selection in the television set.

A switch is provided for actuation by the tuner operation upon arrival at a predetermined position thereof to deenergize the television receiver. The remote control signal receiver remains energized. Accordingly, arrival of a channel changing signal from the sonic transmitter will again energize the television receiver upon activating the tuner motor.

A second switch is provided according to this invention, having a first position whereby the remote control signal receiver will remain energized at all times regardless of the state of the television receiver. The switch has a second position whereupon the remote control signal receiver will be energized only at such time as the television receiver is energized. This switch is operated by a stepping relay in the remote signal receiver which controls the volume control of the television receiver. The switch remains in the said first position so long as the volume control is in any one of three volume settings, maximum, two-thirds, and one-third. When the stepping relay moves the volume control to the mute position, it also moves the switch of the present invention to the second of its positions. Accordingly, at any time that the tuner is in the position where the first switch is opened, and the volume control is also at the mute position, both the television receiver and the remote control signal receiver are deenergized. Accordingly, the customer can deenergize both by remote control without the addition of a third control channel to the remote receiver and remote transmitter.

The full nature of the invention will be understood from the accompanying drawings and the following description and the claims:

Figure 3A:
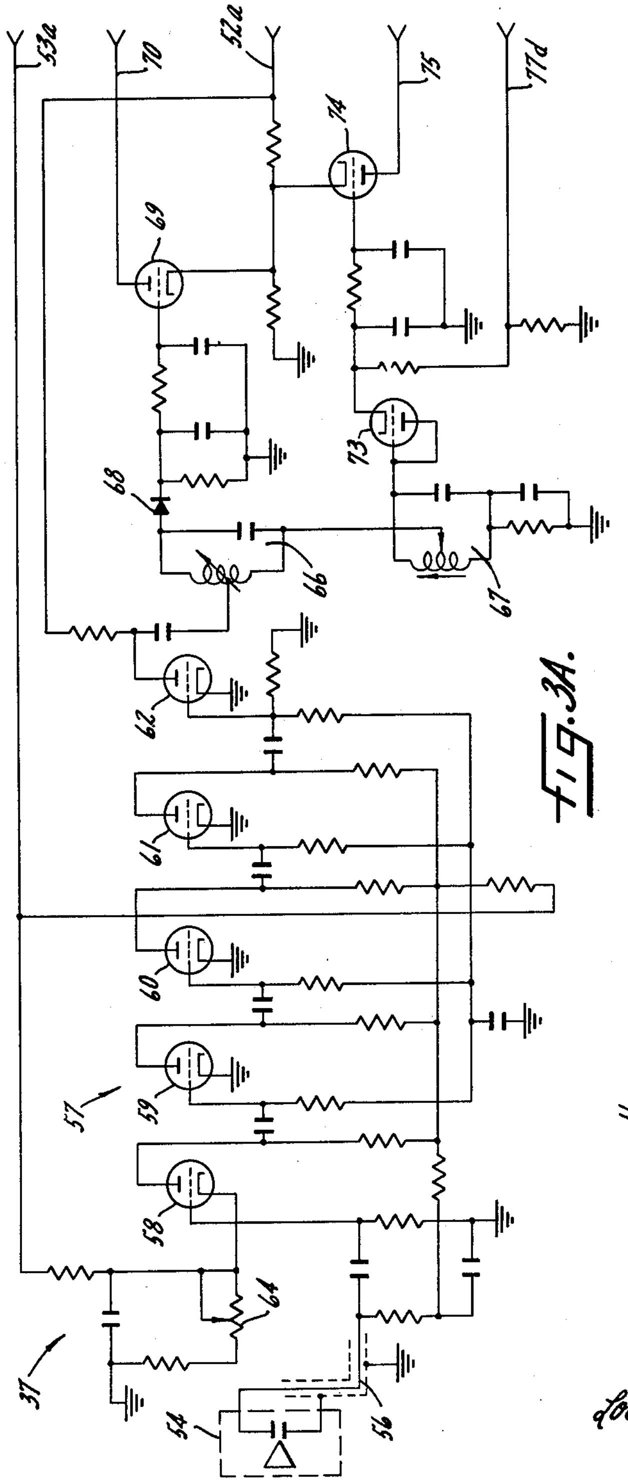
Figure 3B:
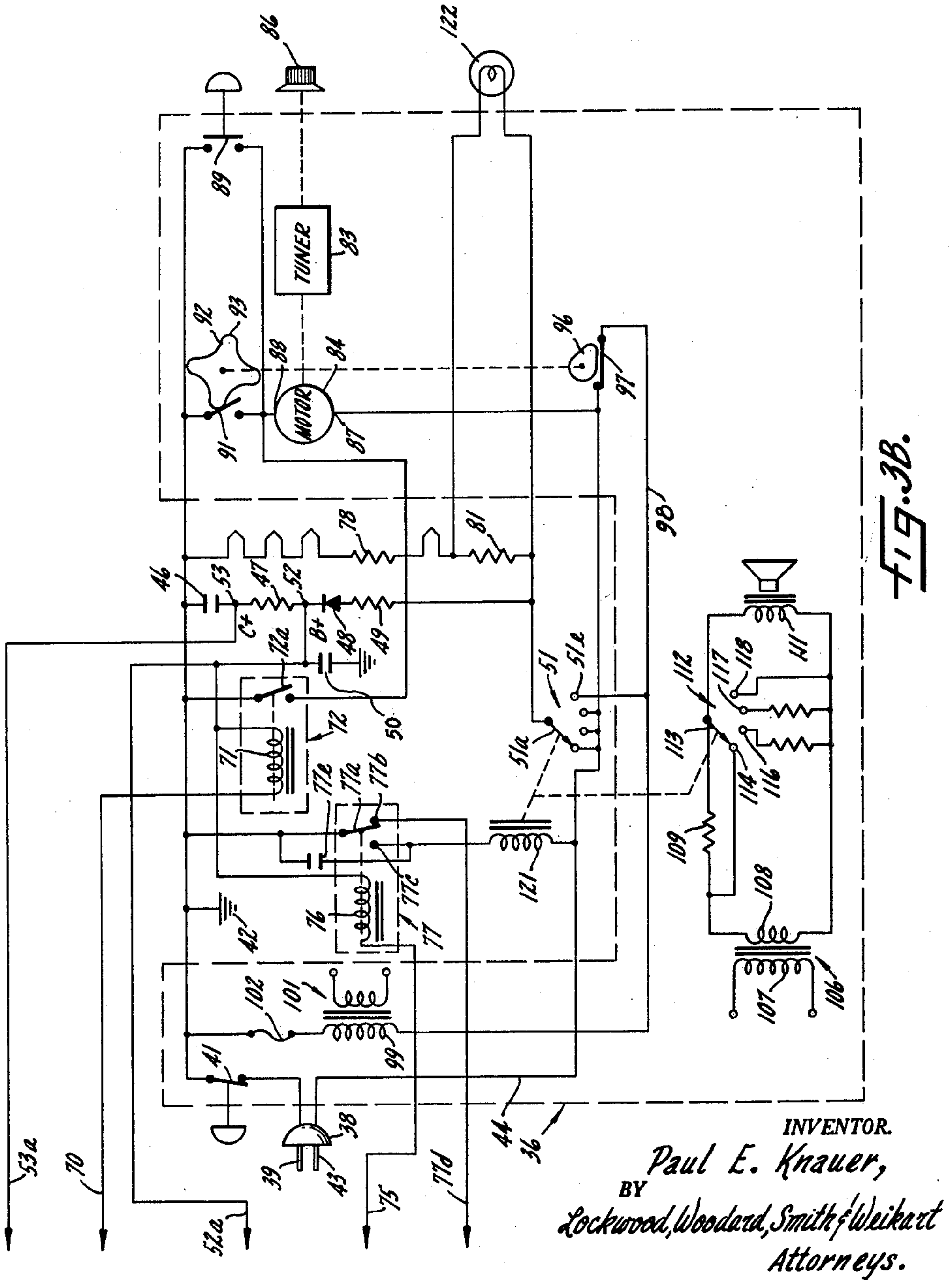

FIGS. 3A and 3B comprise a diagram partly in schematic and partly in block form illustrating a typical embodiment of the present invention.

Figure 2:
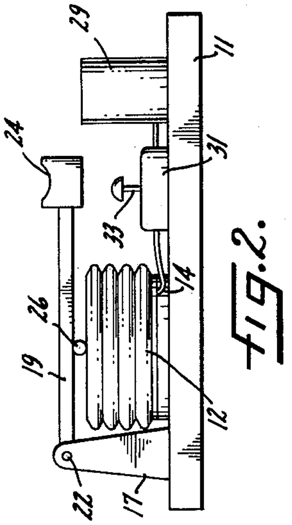
FIG. 2 is a side elevation thereof.
Figure 1:
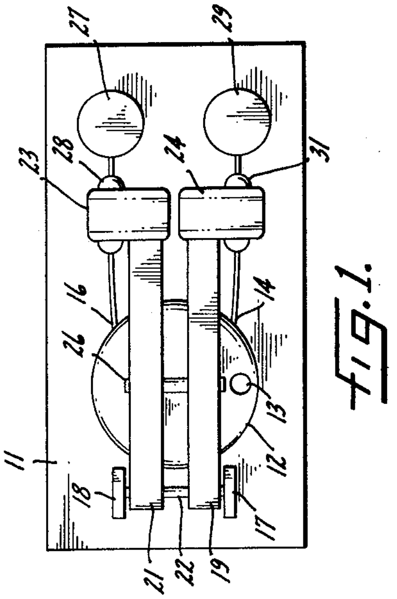
FIG. 1 is a symbolic plan view of a sonic transmitter which may be used in the practice of the present invention.

Referring to FIGS. 1 and 2, base 11 carries an air bellows 12 having a valved intake 13 and a pair of outlets 14 and 16. The base also has a pair of supports 17 and 18 mounted thereto whereby lever arms 19 and 21 are supported at one end on the shaft 22. At the other end of each of the lever arms is an operating button which, for purposes of example, will be designated button 23 for channel selection and 24 for volume control. A bar 26 disposed across the top of the bellows 12 supports both of the buttons. Accordingly, depression of either of the buttons 23 and 24 functions to actuate the bellows.

A whistle 27 tuned to produce a signal at a frequency of 28 kilocycles, for example, is connected through the valve 28 to the bellows outlet 16. A similar whistle 29, tuned to produce a signal at a frequency of 22 kilocycles, for example, is connected through the valve 31 to the bellows outlet 14. Each of the valves 28 and 31 includes an operating button 33, which can open the valve upon depression of the button. Consequently, depressing the channel button 23 compresses the bellows 12 and upon being further depressed to engage the corresponding button 33 on valve 28, opens the valve to permit air to be forced from the bellows 12 through the whistle 27 to produce a signal at 28 kilocycles. Similarly, operation of the button 24 is effective to produce a signal at 22 kilocycles. Each of these signals is capable of operating a channel in the remote control signal receiver as will become apparent.

Referring to FIGS. 3A and 3B, power input to both the television receiver 36 and the remote receiver 37 is provided by way of the line plug 38. One terminal of the plug 38 is connected through the "on-off" switch 41 to ground 42. Switch 41 is, of course, optional, since the receivers can be completely deenergized without use of the switch 41, by virtue of the present invention. The other terminal 43 of plug 38 is connected to the hot input line 44 for both the television receiver and the remote receiver.

Assuming all switches to be in the positions shown in FIGS. 3A and 3B, and the plug 38 to be connected to a source of electrical energy, the various direct current potentials for the remote receiver are provided in the following manner. A series combination of capacitor 46, resistance 47, selenium power diode 48, resistance 49 and the switch 51 of the present invention, is connected between the line 44 and ground 42. A B+ potential is thereby provided at the junction 52 between diode 48 and resistance 47, there being a B+ filter input capacitor 50 connected between junction 52 and ground. A C+ potential is provided at the junction 53 between the resistance 47 and the capacitor 46. These potentials are applied by lines **52*a* and 53*a*** to various points in the remote receiver as required.

The remote receiver includes a microphone 54 responsive to the signals generated by the sonic transmitter of FIG. 1. The microphone output 56 is coupled to a four-stage, resistance-capacitance coupled broad band amplifier 57 including five triodes 58 through 62, which of course, can be sections of dual triodes. Potentiometer 64 connected to the cathode of triode 58 provides for a sensitivity adjustment.

Triode 62 is in an inductively tuned circuit, tuned by way of tank circuit 66 to 28 kilocycles, and by way of tank circuit 67 to 22 kilocycles. Accordingly, the output of triode 62 is divided into two signal channels. Selenium diode 68 is used as a detector for the 28 kilocycle signal. Detection of a 28 kilocycle signal drives triode 69 out of its normal cutoff condition, allowing this tube to conduct. This initiates conduction through the plate conductor 70 and the coil 71 of the channel select relay 72 to initiate functions which will be described subsequently.

The 22 kilocycle signal, which controls the volume, is detected by the triode 73, which is connected as a diode. The detected signal is applied to the grid of the triode 74 driving this tube out of normal cutoff. Conduction in this tube provides a current flow through the plate conductor 75 and the operating coil 76 of the sound relay 77 to provide functions which will be described hereinafter. Triode 69 may be one section of a dual triode, the other section of which may be triode 62 if desired. Similarly triode 73 and 74 may be sections of a dual triode. Various resistances and capacitances shown in the amplifier will not be described herein inasmuch as their functions are conventional and well known in the amplifier art. Assuming that the triodes shown are dual triodes, the four heaters therefor are shown in a serial connection with resistances 78 and 81 and the switch 51 of the present invention, across the lines 44 and 42.

In the television receiver, tuner 83 is connected to the drive motor 84 whereby the tuner may be positioned to make various channel selections by means of the motor 84. A knob 86 is also connected to the tuner for manual selection of channel at the television receiver.

Terminal 87 of the motor is connected to the hot line 44. Terminal 88 of the motor is connectable to ground 42 by way of any one of three switches. The first of these switches is the normally open "Power Tune" switch 89 operable at the television receiver by the customer. The second switch connected between terminal 88 and ground is the program switch 91. The third switch connected between terminal 88 and ground consists of the normally open switch **72*a* of the channel relay 72**.

The program switch 91 is operable by a cam wheel 92 driven by the motor 84. The cams 93 on the cam wheel are disposed in such fashion that whenever the tuner is at a position that there is no local station which can be received, the cam will close the switch 91 and continue operation of the motor 84 even though the power tune switch 89 or the channel relay switch **72*a* is open at the moment. Accordingly, the motor will advance the tuner to the next channel upon which a station may be received. The motor 84 is also connected to and drives cam 96. This cam is effective to open the switch 97. This switch is normally closed and therefore normally connects the hot side of the switch at hot line 44 to the cold side of the switch connected to line 98. It thereby normally completes a circuit path from line 44 through the primary winding 99 of the television receiver power transformer 101, and through circuit breaker 102 to ground 42. By the use of switch 97** in this manner, it is possible to provide an on-off function of the television receiver at one position of the tuner which may be any desired one of those positions where a local station or channel is not available.

From the foregoing, it can readily be recognized that channel selection can be obtained by use of the manual tuning knob 86, the power tune switch 89, or the remote control transmitter button 23. Operation of the latter button, produces the sonic signal of 28 kilocycles which energizes coil 71 of the channel relay 72 to close the switch contacts **72*a* and thus operate the tuner drive motor 84. It will also be recognized, that by virtue of the provision of the cam 96 and switch 97, and assuming that switch 41 is closed, the power tune switch, the manual tuning knob, or the remote control transmitter button 23 can be employed in order to turn the television receiver off or turn it on. Use of the button 23** of the remote transmitter, of course, presupposes that the remote receiver is energized at the time, in order to turn on the television receiver.

Referring further to FIG. 3B particularly, certain additional details of the television receiver are shown to illustrate the environment of the present invention. The television audio transformer 106 is shown with primary winding 107 and secondary winding 108. The secondary winding is connected in series with resistance 109 and the speaker coil 111. A four-position volume control switch 112 is provided having a movable contact 113 connected between the resistance 109 and the coil 111. For maximum speaker output, the movable contact 113 engages the fixed contact 114. For two-thirds volume, the movable contact 113 engages the fixed contact 116. For one-third volume, the movable contact 113 engages the fixed contact 117. In order to provide no output to the speaker, a mute terminal 118 is provided so that when the movable contact 113 engages the mute contact 118, no speaker output is provided.

While this volume control switch may be manually operated or other volume control switches may also be provided in addition to this, this switch is particularly well suited to remote operation.

It was noted above, that the remote receiver responds to a signal at 22 kilocycles to produce a current flow through the winding 76 of the sound relay 77. This causes the movable contact 77*a* of the sound relay 77 to disengage fixed contact 77*b* and engage contact 77*c* thereof. Capicitor 77*e* avoids arcing. A winding 121 of a stepping relay is connected between the contact 77*c* and the hot line 44. Therefore, production of a 22 kilocycle signal by depressing the volume control button of the remote transmitter energizes the stepping relay 121. This relay is connected to the movable contact 113 of the volume control switch 112 and is capable of moving the movable contactor thereof one step each time the stepping relay is energized. Therefore, on the first depression of the volume control button 24 subsequent to location of the movable contactor 118 in the position shown in FIG. 3, the movable contactor would be advanced to engagement with contact 116. Thus, the volume would be changed from maximum to two-thirds maximum. The next depression of the button would change the volume to one-third maximum with the advance of the movable contactor to engagement with the terminal or contact 117.

In each of the three aforementioned conditions of the volume control movable contactor, the movable contactor 51*a* of the switch 51 is engaged with terminal connected to the hot line 44. Accordingly, as the volume control button is operated, the stepping relay advances the volume control switch 112 and also advances the switch 51 which is also operated by the stepping relay. In each of the three mentioned conditions, switch 51 maintains the remote receiver, power supply and filament supply energized.

The next depression of the remote control volume control button 24 advances the movable contactor of the volume control switch to the mute contact 118. It also advances the movable contactor 51*a* of the switch 51 to engagement with the fixed contactor 51*e* thereof. The fixed contactor 51*e* is connected to the line 98. In this position or condition of switch 51, the remote receiver filament and power supply branches will be energized only so long as switch 97 is closed. It will thus be recognized, that whenever the volume control switch is in the mute condition, and the tuner is in the position for the receiver off function, both the television receiver and the remote receiver will be deenergized. Deenergization of the remote receiver is indicated by the extinguishing of the pilot light 122 connected across the resistance 81 in the filament circuit of the remote receiver.

In view of the foregoing, it will be appreciated that whenever the customer wishes to turn off the television receiver remotely and yet be able to again turn the receiver on remotely, he need only operate the channel select button 23 to the condition where the switch 97 is open, thus turning off the television receiver. He may then turn the television receiver on remotely by again pressing the channel select button 23. At any time the customer wishes to turn off both the television receiver and the remote receiver, he need only press the channel select button 23 to place the television receiver in the off condition and press the volume control button 24 until the volume control is advanced to the mute condition whereupon both units will be turned off. Of course, which of the two remote control buttons is operated first to achieve the master off function, is inconsequential, by virtue of the novel switching arrangement of the present invention.

It will be recognized, that if desired, the switch 51 may be mechanically connected to the stepping relay 121 or the volume control switch 112 to be operated only when the volume control switch is in the mute condition in which case, the switch 51 can be a single-pole double-throw A.C. switch. Moreover, the present invention is useful with a large variety of television or radio receivers currently available on the market, particularly television receivers with a power-tune function. The remote control need not be accomplished by sonic signals but could be accomplished, for example, by radio frequency signals if desired. Therefore, while the expression "television receiver" is employed in the claims herein, it should be considered used generically and understood to cover a radio receiver or other type of signal receiver as well. The tuner drive "motor" should be understood to cover a wide variety of electromechanical devices. Because of the versatility of the present invention, and its applicability to a wide range of signal receivers and systems, it has not been necessary to describe any particular television receiver in the description of the present invention. Similarly, the inventive concept of the present invention can be extended to a variety of remote control signal receivers as well, and their cooperation with the television receiver can be effected in a manner comparable to that illustrated in the disclosed embodiment, and such systems should therefore be considered within the scope of the present invention.

Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a system for remote control of a television set or the like:

input means for connection to a source of electrical energy;

a television receiver;

a first switch coupling said television receiver to said input means;

a first remotely controllable multi-position operating element in said television receiver, said element being positionable in a plurality of distinct stable positions;

a second remotely controllable multi-position operating element in said television receiver, said second element being positionable in a plurality of distinct stable positions;

a remote control signal receiver having a pair of output channels, one of said channels being responsive to energy at a first frequency and coupled to said first element to drive said first element to its various said stable positions in succession in response to signals of said first frequency, and the other channel of said pair being responsive to energy at a second frequency and coupled to said second element to operate said second element to its various stable positions in succession in response to signals at said second frequency;

means coupling said first element to said first switch, said coupling means being operable by said first element to open said switch upon a predetermined extent of operation of said first element through a plurality of its positions;

a second switch having a first condition coupling said remote receiver to said input means through a first path, said second switch being operable to a second condition coupling said remote receiver to said input means through a second path including said first switch;

and second means coupling said second switch to said second element, said second coupling means being operable by said second element to change said second switch from said first condition to said second condition upon a predetermined extent of operation of said second element;

whereby signals at said first frequency are useful to operate said first element through its said positions to its said predetermined extent and open said first switch to disconnect said television receiver from said input means and thereby deenergize said television receiver, and signals at said second frequency are useful to actuate said second element to operate said second element through its said positions to its said predetermined extent and change said second switch to said second condition to disconnect said remote receiver from said input means when said first switch is open and thereby deenergize said remote receiver.

2. In a system for remote control of a television set or the like:

input means for connection to a source of electrical energy;

a television receiver;

a first switch coupling said television receiver to said input means;

a remotely controllable television tuner drive motor, a volume control in said television receiver;

a remotely controllable stepping device connected to said television receiver volume control;

a remote control signal receiver having a pair of output channels, one of said channels being responsive to energy at a first frequency and coupled to said drive motor to energize and thereby operate said drive motor in response to signals of said first frequency, and the other channel of said pair being responsive to energy at a second frequency and coupled to said stepping device to actuate said device through a series of steps and thereby to operate said volume control in response to signals at said second frequency;

means coupling said drive motor to said first switch, said coupling means being operable by said drive motor to open said switch upon a predetermined extent of operation of said drive motor;

a second switch having a first condition coupling said remote receiver to said input means through a first path, said second switch being operable to a second condition coupling said remote receiver to said input means through a second path including said first switch;

and second means coupling said second switch to said stepping device, said second coupling means being operable by said device to change said second switch from said first condition to said second condition upon achievement of a predetermined number of steps of operation of said stepping device;

whereby signals at said first frequency are useful to operate said drive motor to said predetermined extent and open said first switch to disconnect said television receiver from said input means and thereby deenergize said television receiver, and signals at said second frequency are useful to actuate said stepping device through said predetermined number of steps to change said switch to said second condition to deenergize said remote receiver when said first switch is open.

3. In a system for remote control of a television set or the like:

input means for connection to a source of electrical energy;

a television receiver;

a first switch coupling said television receiver to said input means;

a remotely controllable television tuner drive motor, a volume control in said television receiver;

a remotely controllable operator connected to said television receiver volume control;

a remote control signal receiver having a pair of output channels, one of said channels being responsive to energy at a first frequency and coupled to said drive motor to energize and thereby operate said drive motor in response to signals of said first frequency, and the other channel of said pair being responsive to energy at a second frequency and coupled to said volume control operator to actuate said operator and thereby operate said volume control in response to signals at said second frequency;

means coupling said drive motor to said first switch, said coupling means being operable by said drive motor to open said switch upon a predetermined extent of operation of said drive motor;

a second switch having a first condition normally coupling said remote receiver to said input means directly and said second switch being operable to a second condition coupling said remote receiver to said input means through said first switch;

and second means coupling said second switch to said volume control operator, said second coupling means being operable by said volume control operator to change said second switch from said first condition to said second condition upon a predetermined extent of operation of said volume control;

whereby signals at said first frequency are useful to operate said drive motor to its said predetermined extent and open said first switch to disconnect said television receiver from said input means and thereby deenergize said television receiver, and signals at said frequency are useful to actuate said operator to operate said volume control to its said predetermined extent and change said second switch to said second condition to disconnect said remote receiver from said input means when said first switch is open and thereby deenergize said remote receiver.

4. In a system for remote control of a television set or the like and including a source of electrical energy and including a television receiver coupled through a first switch to said source, said television receiver having first and second remotely operable controllers therein, the first of said controllers being operably connected to said first switch to open said first switch in a predetermined position of said first controller and thereby deenergize said television receiver, and the system including a remote control signal receiver coupled to said controllers for operation of said controllers according to predetermined signals from a remote location, means for deenergizing both said television receiver and said remote receiver and comprising:

a second switch coupling said remote receiver to said source of electrical energy, said second switch including a first contact connected to the hot side of said first switch, said second switch including a second contact connected to the cold side of said first switch, and said second switch including a third contact, said third contact being movable between a position of connection with said first contact and a position of connection with said second contact whereby said remote receiver can be electrically disconnected from said source of electrical energy when said first line switch is open, said movable contact being connected to said second controller for operation thereby.

5. In a system for remote control of a television set or the like and including a source of electrical energy, and including a television receiver coupled through a first switch to said source and said television receiver having a tuner coupled to the first switch to open said switch at a predetermined position of said tuner and thereby deenergize the receiver, the system including a remote control signal transmitter, and the system including a remote control signal receiver operable by said transmitter and coupled to said tuner to operate said tuner in response to signals from said transmitter, and said system including a volume control switch coupled to said remote receiver and operable by signals from said transmitter, means for deenergizing both said television receiver and said remote receiver and comprising:

a second switch coupling said remote receiver to said source of electrical energy;

said second switch including a first contact connected to the hot side of said first switch, said second switch including a second contact connected to the cold side of said first switch, and said second switch including a third contact, said third contact being movable between a position of connection with said first contact and a position of connection with said second contact whereby said remote receiver can be electrically disconnected from said source of electrical energy when said first switch is open, said movable contact being connected to said volume control switch for operation thereby.

References Cited in the file of this patent

UNITED STATES PATENTS 2,992,412 Spindler -------------- July 11, 1961